(12) United States Patent
Andrews

(10) Patent No.: US 10,972,351 B2
(45) Date of Patent: Apr. 6, 2021

(54) DYNAMIC MANAGEMENT OF NETWORK ENVIRONMENTS

(71) Applicant: Allied Telesis Holdings Kabushiki Kaisha, Tokyo (JP)

(72) Inventor: Keith Michael Andrews, San Jose, CA (US)

(73) Assignee: ALLIED TELESIS HOLDINGS KABUSHIKI KAISHA, Tokyo (JP)

( * ) Notice: Subject to any disclaimer, the term of this patent is extended or adjusted under 35 U.S.C. 154(b) by 207 days.

(21) Appl. No.: 15/802,916

(22) Filed: Nov. 3, 2017

(65) Prior Publication Data

US 2018/0123888 A1     May 3, 2018

Related U.S. Application Data

(60) Provisional application No. 62/417,244, filed on Nov. 3, 2016.

(51) Int. Cl.
    *H04L 12/24*      (2006.01)

(52) U.S. Cl.
    CPC ...... *H04L 41/0846* (2013.01); *H04L 41/0853* (2013.01); *H04L 41/0806* (2013.01); *H04L 41/145* (2013.01); *H04L 41/22* (2013.01)

(58) Field of Classification Search
None
See application file for complete search history.

(56) References Cited

U.S. PATENT DOCUMENTS

| | | | | |
|---|---|---|---|---|
| 6,959,332 B1* | 10/2005 | Zavalkovsky | ...... | H04L 41/0893 709/223 |
| 7,318,199 B2* | 1/2008 | Nickolayev | ............. | H04L 41/12 345/619 |
| 8,407,576 B1* | 3/2013 | Yin | ........................ | G06F 3/0481 715/206 |
| 10,374,905 B2* | 8/2019 | Herreria | .................... | G06F 8/34 |
| 2013/0044764 A1* | 2/2013 | Casado | ................. | H04L 41/044 370/401 |
| 2013/0187926 A1* | 7/2013 | Silverstein | ........... | G06Q 10/105 345/440 |
| 2013/0346260 A1* | 12/2013 | Jubran | .................. | G06F 9/5072 705/28 |
| 2014/0095463 A1* | 4/2014 | Pappas | .................. | G06F 16/951 707/706 |
| 2015/0082308 A1* | 3/2015 | Kiess | .................... | G06F 9/5072 718/1 |
| 2016/0050116 A1* | 2/2016 | Sheshadri | ........... | H04L 41/0843 709/221 |

* cited by examiner

*Primary Examiner* — Esther B. Henderson
(74) *Attorney, Agent, or Firm* — Concept IP LLP; Michael Zarrabian

(57) ABSTRACT

A method comprising: collecting information on one or more network devices; storing the collected information in a database; mapping the stored information to abstracted values; presenting the mapped information to a user for selection and inclusion into a template; creating, responsive to the user input, one or more templates comprising one or more abstracted values; activating, responsive to the user input, one or more created templates; and accessing one or more network devices based on the activated one or more templates.

17 Claims, 14 Drawing Sheets

DYNAMIC MANAGEMENT OF NETWORK ENVIRONMENTS

CROSS-REFERENCE TO RELATED APPLICATION

This application claims the priority benefit of U.S. Provisional Patent Application Ser. No. 62/417,244, filed Nov. 3, 2016, incorporated herein by reference in its entirety for all purposes.

TECHNICAL FIELD

The invention, in its several embodiments, pertains to computing networks, and more particularly to management of computing networks.

BACKGROUND

Construction of customized networks, such as computing and communication networks, for specific tasks or workloads is utilized in test environments where costly network resources are shared. In these environments, users need the ability to provision the actual physical network devices and not just the resources running on them. Often times these networks are only needed for a short amount of time or until the specific workload or test have been completed. Thereafter, the network is either kept in place until the specific workload needs to be run again, or the network is dismantled so that the devices and physical connections can be used elsewhere. In either case, the time it takes to setup and configure a customized network can sometimes take longer than the time it is actually needed for the workload.

There are similar challenges in production network environments. Network resource needs and demands can change and therefore physical connections, configurations, and even the network resources themselves need to be swapped out or reconfigured. For example, as network routes increase there may be a need to enable a dynamic routing protocol. This may involve bringing a new router into the network or configuring the protocol on an existing router. In either case, as the needs of the network change, so do the devices within it.

SUMMARY

An exemplary method comprising: collecting information on one or more network devices, where each of the one or more network devices have one or more attributes; storing the collected information in a database; mapping the stored information to abstracted values, wherein the abstracted values comprise one or more abstracted device types and one or more abstracted device attributes corresponding to the abstracted device types; presenting the mapped information to a user for selection and inclusion into a template, where the presented mapped information is independent of a location of the one or more network devices and a detailed resource characteristic of the one or more attributes; creating, responsive to the user input, one or more templates comprising one or more abstracted values; activating, responsive to the user input, one or more created templates; and accessing one or more network devices based on the activated one or more templates.

The one or more network devices may be at least one of: a physical device and a virtual device. The one or more abstracted device attributes may be at least one of: a feature of the network device that can be enabled and the feature of the network device that can be disabled. The one or more abstracted device attributes may be at least one of: a function of the network device that can be activated and the function of the network device that can be deactivated. The one or more abstracted device attributes may be at least one of: a set of instructions that can be executed on the network device and a set of instructions that can be executed between two or more network devices. The one or more abstracted device attributes may be at least one of: a physical characteristic of the network device that can be controlled and the physical characteristic of the network device that can be modified. The one or more abstracted device attributes may be at least one of: an external connected component of the network device that can be controlled and the external connected component of the network device that can be modified.

Additional method embodiments may comprise: determining if the accessed one or more network devices is available; and creating a virtual instance of the one or more network devices having the one or more attributes in the created template if the one or more network devices is unavailable. The abstracted device types may be at least one of: a physical device and a virtual device, and wherein the abstracted device attributes are at least one of: a physical device attribute, and a virtual device attribute.

In some embodiments, the created one or more template may further comprise one or more connections between the one or more abstracted device types. The created one or more template may further comprise one or more actions, where the one or more actions may be based on the one or more abstracted device types, the one or more abstracted device attributes, and the one or more connections between the one or more abstracted device types.

BRIEF DESCRIPTION OF THE DRAWINGS

Embodiments of the present invention are illustrated by way of example and not limitation in the figures of the accompanying drawings, which may not be drawn to scale, and in which.

DETAILED DESCRIPTION

Figure 1:
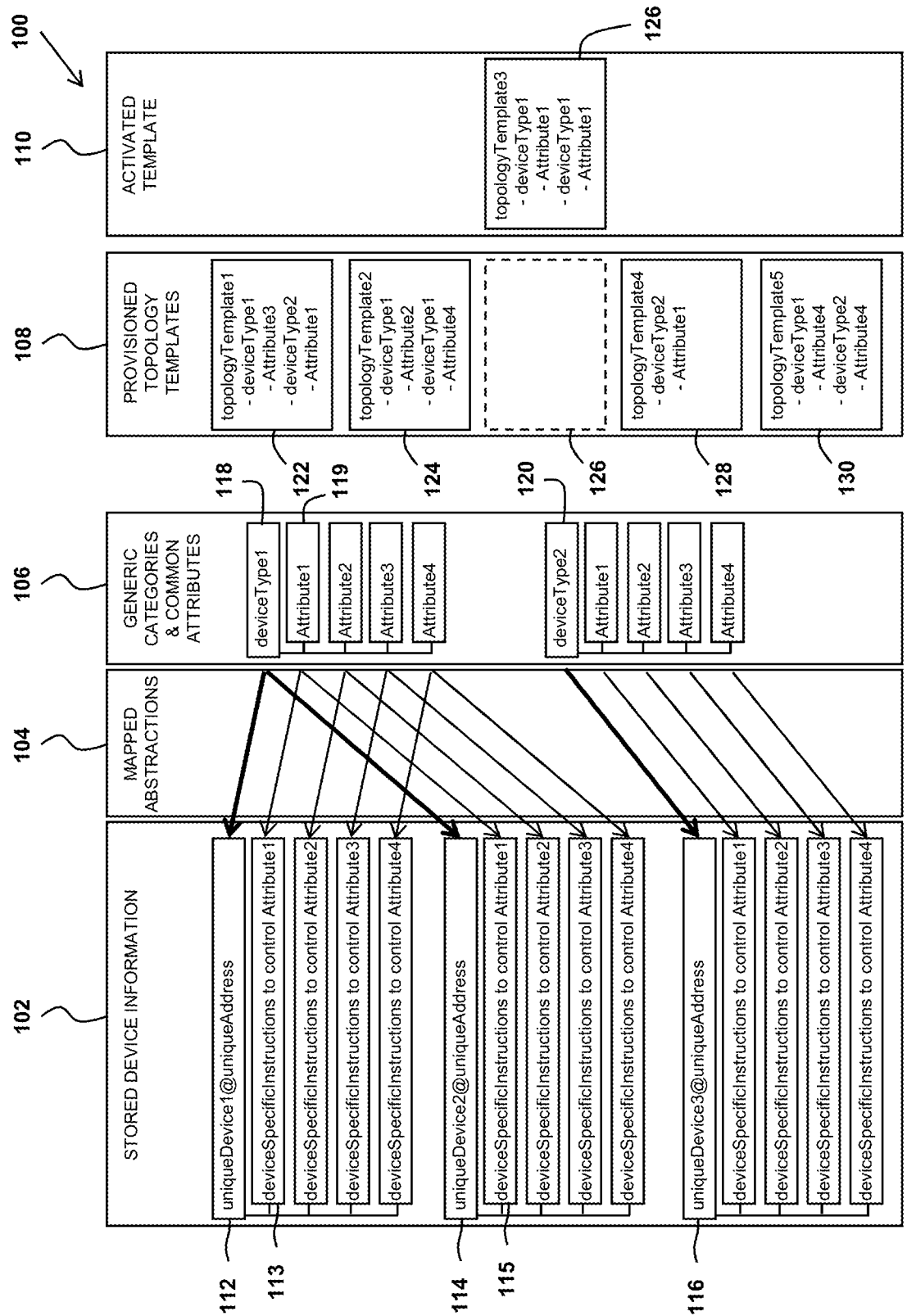
FIG. 1 shows a system to manage devices in a network in accordance with one embodiment.

The description herein is made for the purpose of illustrating the general principles of the embodiments disclosed herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

The disclosed system allows a user to create, store, and activate templates that contain abstracted device types, abstracted device attributes corresponding to those abstracted device types, connections between the abstracted device types, and actions based on the abstracted device types and attributes in the templates. The user may select various desired abstracted device types and abstracted attributes without knowledge of the underlying devices being used. For example, the user can select a router (abstracted device type) with the capability to open a port (abstracted device attribute) without selecting the specific router with those capabilities. The user may then establish a connection in the template between the router and a traffic generator (another abstracted device type) with the ability to run an application to generate traffic (abstracted attribute). The user may then establish an action, such as directing the traffic generator to generate traffic through the connected router. The user only interacts with a single syntax and abstracted values, instead of the multitude of devices and syntaxes. In some embodiments, the system may create a virtual device with the user selected abstracted device type and abstracted device attributes if a physical device is not available. The disclosed system allows the user to quickly create, store, and run templates that would otherwise require physical set-up and tear-down, as in a test lab setting.

While more than one network device may be capable of completing a particular task, in many cases each device must be configured differently. This means that setting up an identical special purpose network on one set of network devices may require a different setup on another set of devices. Even in the event that the network device models are identical, their physical and logical addressing and connections may be different and thus require an altered setup.

Just as there are physical challenges when demands change on a network, the same problems exist when it comes to virtualized deployments. There are many private and public cloud-based virtual hosting platforms that can scale up or down based on test or production network needs. These include solutions which provide a public web service that enables users to automate the bringing up and/or down of virtual server instances and resources on demand. Other open source projects and commercial platforms provide users the ability to control large pools of compute, storage, and networking resources. The problem with each of these platforms is that their underlying application programming interfaces (APIs) and procedures required to bring up resources, differ. In addition, the way virtual elements and services are installed and behave on one set of physical resources, may be different from one another.

Software-Defined Networking (SDN) attempts to standardize the way network services behave and resources are deployed on a network. In SDN, an application called a controller is used to externally manage the control plane of external network devices. SDN allows the separation of network services from physical devices using standard protocols such as OpenFlow. While SDN can provide a way to activate services and push policies across network devices, it does not provide a means to provision the configuration of local services and internal/external attributes of individual devices.

Another attempt has been to simplify and speed the deployment of cloud services over heterogeneous environments, whereby users can provision and create templates to deploy virtual resources independently of the infrastructure they are going be activated on. While such attempt aid in the deployment of virtualized services over public and private cloud infrastructures, it does not provide the ability to create templates for the actual physical network devices running the virtualized resources and services.

Embodiments of a system and method for cataloging and mapping network resources and their capabilities to selectable options a user can choose from to provision and customize a special purpose network. One or more embodiments provide a method to dynamically activate a provisioned network along with one or more set of desired actions across a dynamic pool of resources. The disclosed embodiments not only simplify the setup, configuration and automation of specific tasks within a network, but also provide efficiencies, e.g., optimization, in the use and reuse of usable network resources.

In one embodiment, the system and method disclosed herein are implemented on a computing system in the form of, e.g., executable code to be stored in a memory device and executed on a processor, to provide: collecting and storing information about network resources and their unique attributes; mapping this information to common abstracted values; presenting abstractions to a user for selection and inclusion into a template; and responsive to a user input, network resources and their attributes within a template are: immediately accessed or provisioned; where the user input is independent of network resource location and detailed resource characteristics.

In one embodiment, a network resource includes at least one of similar and disparate resources. In one embodiment, a resource is at least one device. In one embodiment, collected devices are categorized based on their attributes. In one embodiment, a user supplies information and based on that information subsequent information is collected automatically. In one embodiment, the device is queried for the information without user participation.

In one embodiment, device attributes include one or more of: features that can be enabled or disabled, functions that can be activated or deactivated, sets of instructions that can be executed on the device, sets of instructions that can be executed between devices, and physical characteristics that can be controlled or modified, external connected components that can be controlled or modified.

In one embodiment, device mappings include one or more of: stored in a database, stored in a file, and stored in individual device files. In one embodiment, presenting collected devices and attributes are selectable objects on a diagram. In one embodiment, selected devices and attributes are displayed independently of non-selected devices. In one embodiment, selected devices are displayed independently of their attributes. In one embodiment, selected devices and their available attributes are displayed together independently of non-selected devices. In one embodiment, provisioned device attributes are selected and arranged to be accessed in a specific order. In one embodiment, selected attributes are activated against available devices which match the category selected within the provisioned template. In one embodiment, common abstracted values for each attribute are automatically assigned.

One example implementation of the disclosed embodiments provides a system and method to collect, store, organize, and present network resources and their attributes for inclusion or exclusion into a live or provisioned network. As devices and resources are added, they are mapped to generic categories based on one or more common attributes. The unique syntax and semantics supported to enable, set, control or configure each resource and its features and functions are also mapped to generic or common values. These generic categories and common attributes can be arranged, staged, saved and activated on mapped devices that support them on demand.

An advantage of the disclosed embodiments over prior network provisioning and cloud orchestration solutions is the ability to activate services and virtual resources, and the ability to activate and orchestrate actual physical network devices as well as their internal and external attributes and local services on demand. The disclosed embodiments enable activation of services and pushing policies to network devices, and enable provision, activation and controlling the device independently.

For example, in one embodiment, a template is created to power up a number of physical servers and other physical networking resources used to interconnect these servers. Once the physical resources are up, virtual resources and services can be started locally or deployed by an external system based on selections in the activated template.

FIG. 1 shows a system 100 to manage devices in a network in accordance with one embodiment. A user may interact with generic categories and common attributes 106 to create provisioned topology templates 108 and activated templates 110 based on mapped abstractions 104 from stored device information 102. Stored device information 102 may be a database that contains one or more devices 112, 114, 116 and the device specific instructions, e.g., syntax needed to control the attributes 113, 115. The stored device information 102 database may include each device 112, 114, 116 in the system inventory and all of the corresponding instructions, ways of connecting, and categorized attributes 113, 115 of each device 112, 114, 116. Ways of connecting to the device may include the device internet protocol (IP) address, the device username and password, any keys, etc.

The unique attributes 113, 115 of each device 112, 114, 116 are stored in the stored device information 102 database. The user interacting with the system 100 can access these unique attributes 113, 115 as abstracted attributes 119 using mapped abstractions 104 to create a unique combination of actions as a template 108, which may then be activated 110 by the user.

For example, if the user wanted to create an adjacency between two routers, the user can select two routers without identifying the specific router makes and models, and then select an abstracted attribute 119 that allows the routers to connect. The user can then specify a connection between the two routers, and an action in the template so that the routers connect together. The user may then save these actions as a template 108 that can be activated 110 on command. When the template is activated 110, two routers of the desired abstracted device type and with the necessary abstracted attribute would be selected, connected together, and activated. All of the unique commands in the unique syntaxes for each router would be sent to these two routers without the user needing to know which specific routers were selected and what specific commands each router needs to execute the desired actions. In some embodiments, one or both of the routers could be virtual devices created by the system for use in the activated template.

The stored device information 102 is the database that includes all the unique instructions, ways of connecting, etc. for each device 112, 114, 116 in the inventory. The stored device information 102 may include physical devices available to a user in the system 100. In some embodiments, the stored device information may also include virtual devices. The stored device information 102 is mapped to abstracted values 104. The abstracted values may include one or more abstracted device types 118, 120 and one or more abstracted device attributes 119 corresponding to the abstracted device types 118, 120. For example, unique device 1 112 and unique device 2 114 may both be abstracted as a device type 1 118. Unique device 1 112 and unique device 2 114 may both have device specific attributes to control attribute 1 113, 115. These controlled attributes 113, 115 may be abstracted to a device attribute 1 119 corresponding to device type 1 118. Common actions for each of these devices 112, 114, 116 are mapped to the common attributes 119 via mapped abstractions 104. For example, If attribute 1 119 of device type 1 118 was an ability to turn a port off, it would be mapped in mapped abstractions 104 based on the unique instructions of unique device 1 112 and unique device 2 114. The user would be presented with an action for a common command for attribute 1 119 of device type 1 118 such as turn off port. Unique device 1 112 and unique device 2 114 are both depicted as having the same attributes 1-4. However, unique device 1 112 and unique device 2 114 may have different sets of attributes, as shown in the devices in each category of FIG. 3. Unique device 3 116 may be a different type of device than unique device 1 112 and unique device 2 114. For example, unique device 3 116 may be a server and the attributes 1-4 of unique device 3 may be mapped 104 to device type 2 as attributes 1-4. Only three devices 112, 114, 116 are shown for the purpose of illustration, but the system 100 may include a large number of physical and/or virtual devices and their corresponding attributes.

Figure 2:
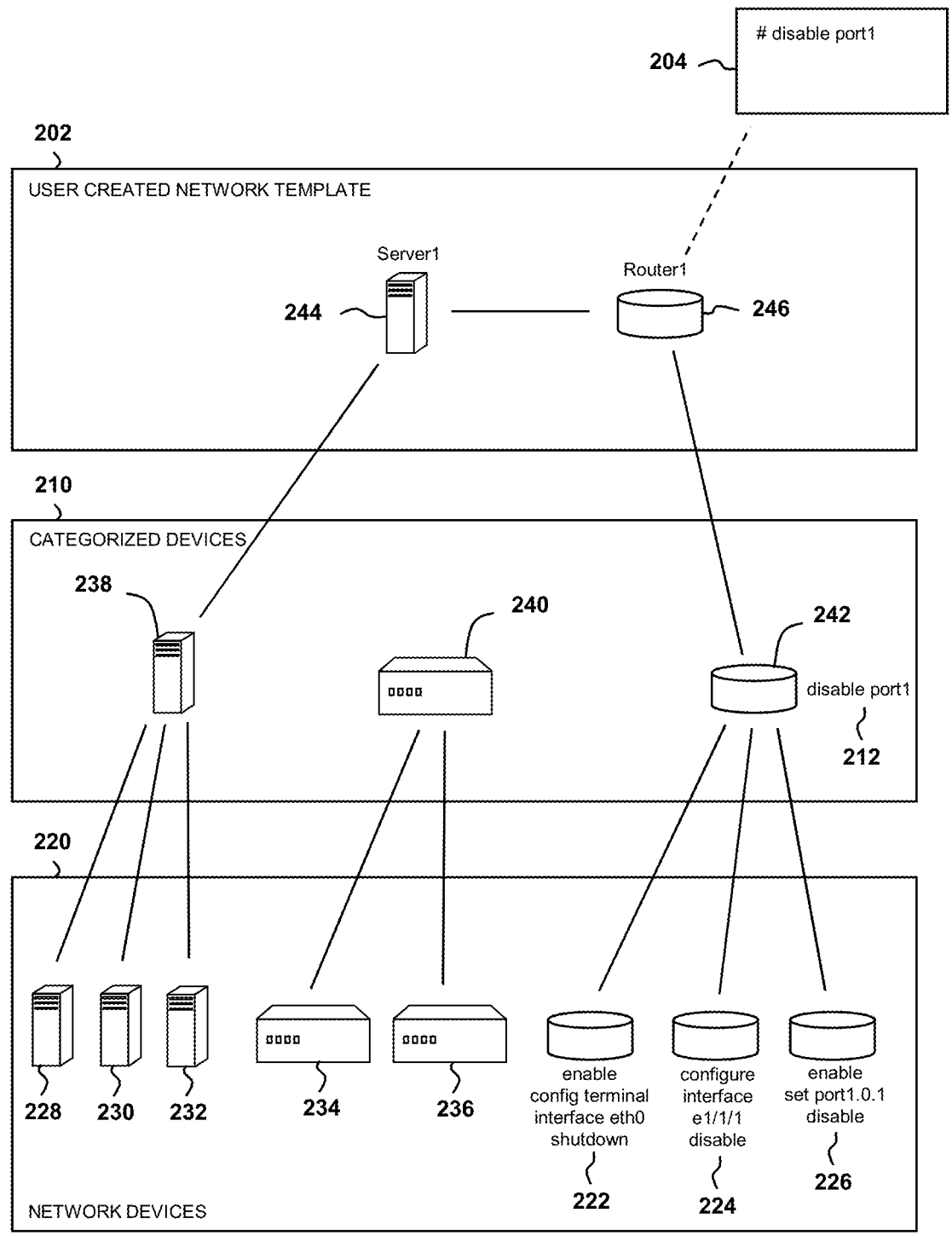
FIG. 2 shows a system used to create a network template based on categorized devices and network device in accordance with one embodiment.

In some embodiments, there may be multiple unique devices 112, 114 in the stored device information database 102 for each device type 118. For example, device type 1 118 may be a router and unique devices 112, 114 may be different router models. The device specific instructions needed to control attribute 1 of unique device 1 112 may be different from the device specific instructions needed to control attribute 1 of unique device 2 114, such as shown in the syntaxes of FIG. 2. If attribute 1 113 of device 1 112 and attribute 1 115 of device 2 114 are an ability to perform the same action, such as turn off a port, then they may be mapped 104 to a common abstracted attribute 1 119 of device type 1 118. The user does not need to be concerned with the specific instructions needed to turn off a port for device 1 112 or device 2 114, the user just needs to select the common attribute 1 119 of device type 1 118, and then by the user selecting an action that requires device type 1 118 and attribute 1 119, the system 100 will send the necessary commands in the necessary syntax to device 1 112 or device 2 114.

Users can create a template 108 rather than activating commands based on common attributes 106. The user may be presented with the mapped information 106 which can then be selected by the user for inclusion into a template 108 that may then be activated 110 by the user. These templates 108 may be stored and saved as an automation flow. The user may want to do certain things in a certain order, and the stored templates 108 allow the user to not need to recreate an environment each time it is needed. Stored templates 108 may also be used when the user doesn't want to do something now, but can create the template to provision it at a later time.

In one example, the user may use the system 100 to set up a test lab to test multiple versions of a piece of software. The user may need to test version one of a software today, version two of the software tomorrow, and version three of the software in a week. The user can create a first template 122 that upgrades all of the devices needed to test, stitches together all of these devices, configures the devices exactly how they need to be configured, and then loads version one of the software on that environment. The user can then create a second template 124 that loads version two of the software. The user can also create a third template 126 that loads version three of the software. The user can then activate any of three templates 122, 124, 126 to run any kind of test that is needed. The user can run a performance test on version one of the software, then run a performance test on version two of the software, and compare the results. The same hardware may be used for each performance test, or different hardware may be used depending on the common attributes selected by the user in each template 108 for running the performance tests. Additional templates 128, 130 may be created and stored for later use. The active template 126 is shown in dashed lines in the saved templates 108 section. In some embodiments, more than one template may be activated in the system. In other embodiments, the user may activate the templates one at a time. The system may provide an indicator to the user if resources needed for a template are unavailable and/or when the resources will be available. The templates may be activated by the user in real time, set to activate at a set time, or set to activate once all of the needed resources become available.

In some embodiments, the resources needed in the stored device information database 102 may be in use elsewhere, but the user of the system 100 can still set everything up and create a template 108 so that when the resources are available, the user can activate the template 110. As the template may be automated, the user doesn't have to physically go and run anything, and the work setting up the template may be done in advance of running the tasks needed.

In some embodiments, the user may create a set of instructions in a template 108 that could be run on either a physical server or a virtual server. If the physical server is available when the template is activated 110, the physical server may be used. Otherwise, the virtual server could be used when the template is activated 110.

In one embodiment, users add devices to the stored device information database 102 by filling out a form that collects information that identifies the device and how to connect to the device, such as but not limited to: its IP address, management, session or control protocol, such as but not limited to: Telnet, SSH, SNMP, HTTP, Python, Rest API, OpenFlow and the unique syntax and semantics required to control each of its attributes. As depicted in FIG. 1, once devices are stored in database 102 and mapped 104 to generic categories and common attributes 106, they can be provisioned and arranged in a desired processing order within a template 108. When the network is needed, the template 108 is parsed or processed, applied and activated 110 on available mapped devices that exist within the category and support the abstracted values, i.e., abstracted device types and abstracted device attributes, selected.

One embodiment allows a user to orchestrate the configuration and bringing up of devices and events using the selection and arrangement of generic or abstracted values rather than the actual values supported by the underlying resources. This means users can build and orchestrate networks without concern about device specifics including, but not limited to, their make, model, unique configuration syntax, semantics, settings, physical location and availability. From the user's point of view, they are setting up and configuring a network and not a template. Every connection, configuration setting, and action is only staged and simulated until it is activated.

FIG. 2 shows a system used to create a network template based on categorized devices and network device in accordance with one embodiment. A user only deals with a single syntax, which could be a command, a button, or a graphical user interface (GUI) representation that will translate this one syntax into whatever commands the underlying device needs to do a desired action.

A plurality of network devices 220 is shown. In this example, the network devices 220 include three servers 228, 230, 232; two switches 234, 236; and three routers 222, 224, 226. Each of the three routers 222, 224, 226 has a different command set to do the same action. For router 222, to shut down the port requires the syntax "enable config terminal interface eth0 shutdown." For router 224, to shut down the port requires the syntax "configure interface e1/1/1 disable." For router 226, to shut down the port requires the syntax "enable set port1.0.1 disable." The three different routers 222, 224, 226 have three different syntaxes to accomplish the same task: shut down a port.

Each device of the same type is categorized in categorized devices 210. In this example, the three servers 228, 230, 232 are categorized as servers 238; the two switches 234, 236 are categorized as switches 240; and the three routers 222, 224, 226 are categorized as routers 242. When the user interacts with any router 222, 224, 226, the user can provide one common syntax 212. If the user wanted to shut down the port, they could use an action in a template having the common syntax "disable port 1" and the system would send the selected router its specific syntax for shutting down the port. This allows the user to accomplish the same task without needing to know the individual commands of each router, because the individual syntax needed is stored, and each device-specific syntax is mapped to a common syntax, as shown in the mapped abstractions 104 in FIG. 1. Users only interact with the abstractions and not the specific syntax of each device. In some embodiments, the common syntax used by the user could include authentication and logging into a device, e.g., one user login could allow access to any number of devices.

The user created network template 202 may use the abstracted values of the categorized abstracted devices, as shown in the common attributes 106 of FIG. 1, to create templates with these values, as shown in the stored templates 108 of FIG. 1. The user may interact with a server 1 244 device type and a router 1 246 device type to establish a connection between a server 1 244 device type and a router 1 246 device type by specifying a connection in the template. However, each device type may have a plurality of underlying devices available for use, as shown in the stored device information database 102 in FIG. 1.

For example, in one embodiment, as depicted in FIG. 2, when devices 220 and their specific commands 222, 224, 226 are mapped to a common abstraction attribute 212 (shown as "disable port1"), a user can select a category 210 and provision and stage within a template 202 specific actions to be performed including, but not limited to, passing abstracted commands through an emulated management session for a device category. In this embodiment, the command instructions of a first syntax and semantics 204 are converted to the device specific commands 222, 224, 226 when the template is activated. In this case when the workload is complete, i.e., the network is no longer needed, resources can be released and available for another template to use.

Figure 3:
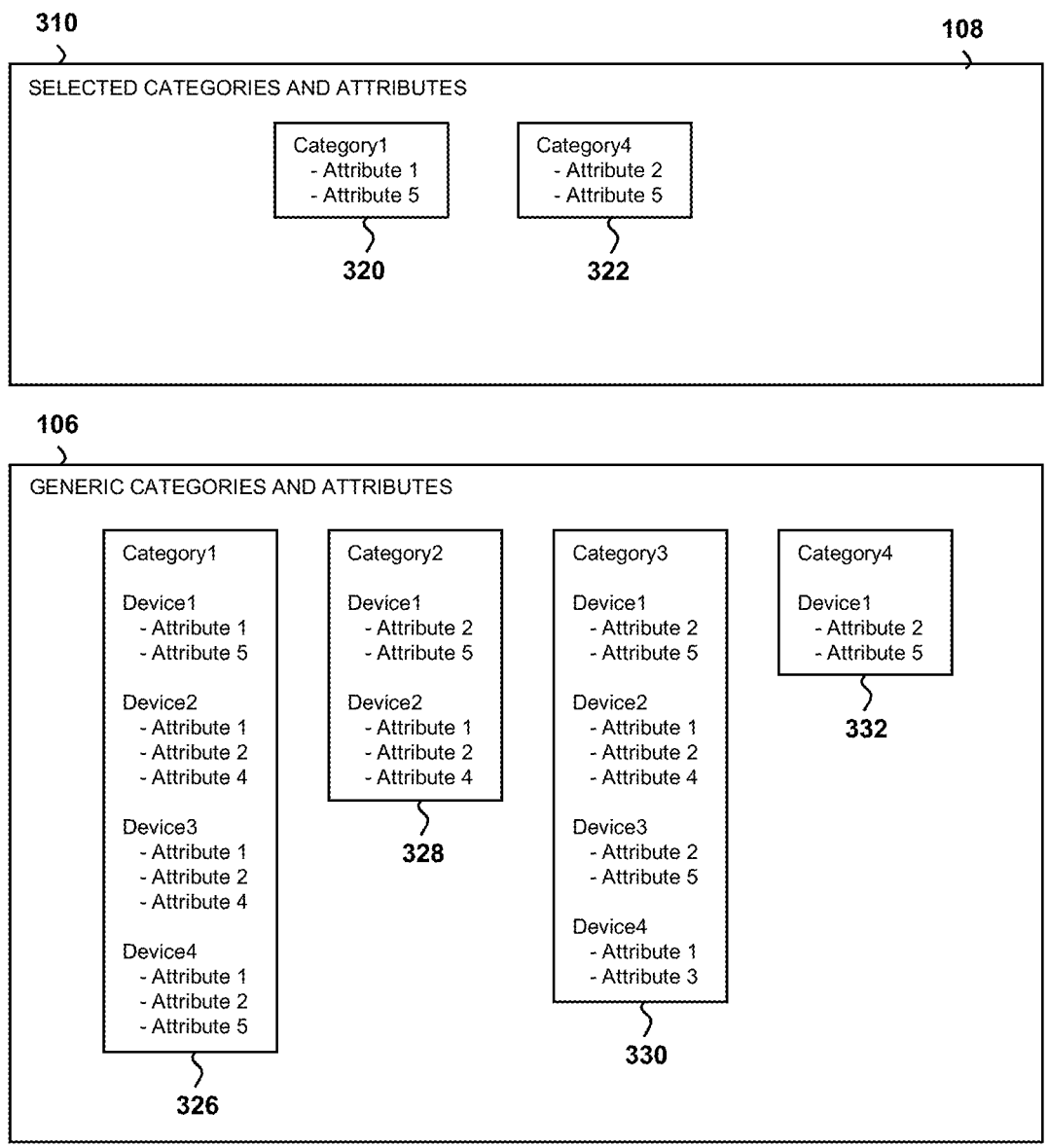
FIG. 3 shows a system that with user selected categories and attributes from a pool of generic categories and attributes for use in a network in accordance with one embodiment.

FIG. 3 shows a system that with user selected categories and attributes from a pool of abstracted categories and attributes for use in a network in accordance with one embodiment. There may be different devices in each category with different corresponding attributes. Each device in a category may not have the same exact attributes as the other devices in a category. Devices in a category may be the same type of device, e.g., a router, but may be different versions, made from different manufacturers, etc.

In the disclosed system, the user doesn't need to pick a specific device. The selected abstracted categories and attributes 310 may be used to create a template, as in saved templates 108 in FIG. 1. The user can just select an abstracted device category 1 326 device that supports attribute 1 and attribute 5 as selected category and attribute 320. The user can also select an abstracted device category 4 332 device that supports attribute 2 and 5 as selected category and attribute 322. For selected 320, there are two devices in category 1 326 that support attribute 1 and attribute 5: device 1 and device 4. Based on the user selection 320 of the abstracted device and corresponding category, the actual device that gets activated could be device 1 or device 4 in category 1 326. The user is just concerned with the category and corresponding attributes, not with selecting from device 1 and device 4.

When user provisions in 310, the user wants a category 1 device and a category 4 device. From category 1, user wants attribute 1 and attribute 5. That would mean, in this example, there are two devices in category 1 326 that match this requirement, i.e., device 1 and device 4. Based on what the user is asking for, the disclosed system would look into category 1 for any device that contains an attribute 1 and an attribute 5. Then, either device 1 or device 4 would be activated upon the activating a template, as shown in activated template 110 of FIG. 1. In this disclosed system, the devices are selected are based on being in the same category and having the attributes selected by the user. In user provisioning 322, the user wants a category 4 332 device with attribute 2 and attribute 5. In this example, there is only one device, i.e., device 1, and it's a perfect match for these requirements.

In one example, if the user wanted a category 2 328 device with attribute 5, then the system would select device 1 when the template was activated. The user can just ask for a category 2 328 device with attribute 5, and doesn't need to specify that he or she wants to use device 1 in category 2 328.

In another example, if the user wanted a category 2 328 device with attribute 1 and attribute 5, and no individual device has both, the system could use a combination of device 1, which includes attribute 5, and device 2, which includes attribute 1. In some embodiments, the system could stitch together a combination of devices needed to perform a desired action in a template as selected by a user. In other embodiments, the system could create a new virtual device (see FIG. 9) for category 2 that has attributes 1 and 5 since neither device 1 or device 2 of category 2 328 meets this requirement. Category 3 330 devices are not selected in these examples, but may be available for selection by the user in the same way that category 1, 2, and 4 devices 326, 328, 332 are available to form templates.

Figure 4:
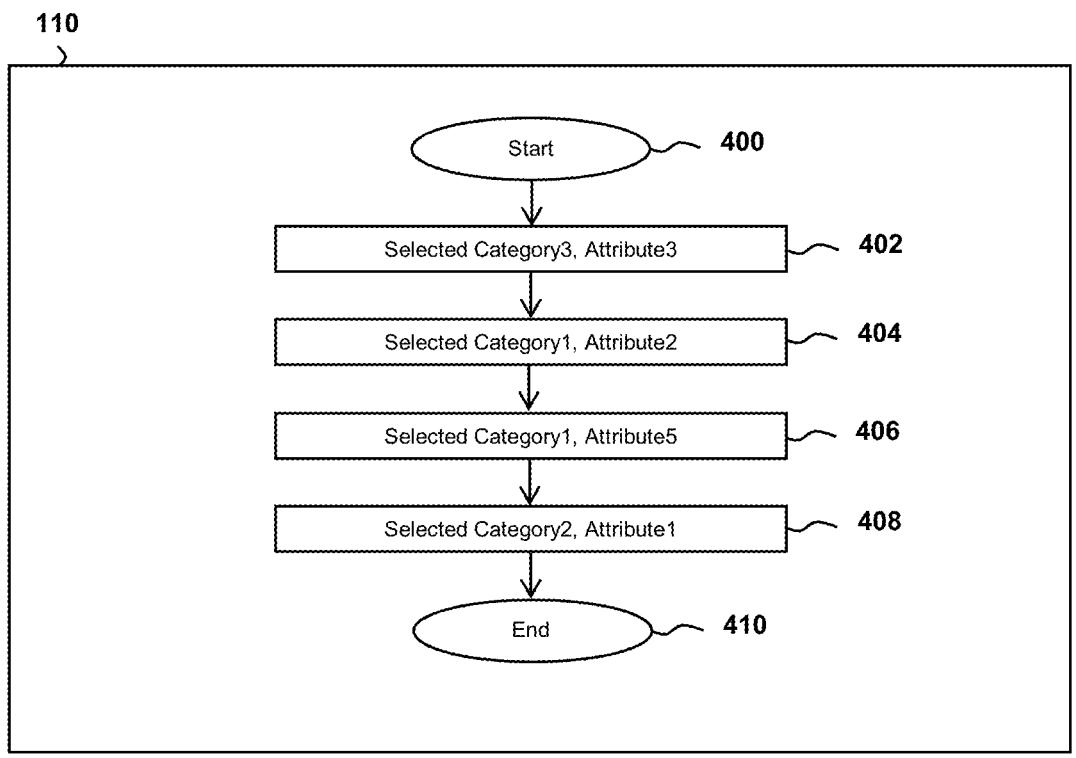
FIG. 4 shows an exemplary flow diagram for common abstracted attributes supported on device categorizes provisioned for activation in a specific sequence or order in accordance with one embodiment.

FIG. 4 shows an exemplary flow diagram for common abstracted attributes supported on device categorizes provisioned for activation in a specific sequence or order in accordance with one embodiment. FIG. 4 shows how the template, as activated 110 in FIG. 1, may be utilized to create a sequence of desired actions specified by the user in a template, as in FIG. 10. Once a template is activated (step 400), a category 3 device with attribute 3 is activated (step 402). Then, a category 1 device with attribute 2 is activated (step 404). Then, a category 1 device with attribute 5 is activated (step 406). Then, a category 2 device with attribute 1 is activated (step 408). The steps of the template may then be completed (step 410). Every time this template is activated, the events happen in a specific sequence. In some embodiments, there may be a wait time between other events being activated. Templates may also include connections and actions based on the activated abstracted device types and corresponding abstracted attributes.

In one example, the template may include a selection of abstracted device types, abstracted device attributes for the selected abstracted device types, one or more connections, and one or more actions to be used to configure a protocol on a first device, launch an application on a second device, start traffic from the second device to the first device, and monitor the traffic being received by the first device. Once the template has run, the user has an environment that's set up exactly how the user needs it to be set up.

In another embodiment, once device categories are selected within a template, the common abstracted attributes supported on those devices are provisioned for activation in a specific sequence or order such as depicted in FIG. 4. In this embodiment, the network template can be activated at a later time or date. When the template is activated, it is applied in the order sequence order supplied on devices that are mapped and capable for the attributes selected. When the customized topology is no longer needed or operations are completed, the devices used within the active topology can be released and made available for other templates that are activated.

In another embodiment, users may want to use or choose specific devices within their topology, but not have to worry about the unique syntax, configuration, and settings needed to activate these devices. In this case, the generic common options can be selected or supplied and applied in real time or arranged, saved and orchestrated upon activation.

In another embodiment, network resources within the pool of resources have the capability to emulate or spawn other devices. In this case, a custom topology is created where these emulations are provisioned or used in the absence of an already available device and configured generically, but activated on one or more resource that supports it. For example, there are many different types of commercial and open hypervisors, such as but not limited to: VMWare's ESXI, Microsoft's Hyper V, XEN Server, and as well as container platforms such as Docker, LXC, OpenVZ and others. These platforms support the building and management of virtual resources. In this embodiment, a virtual host or container is a category selected and generically provisioned and created when a template is activated.

In another embodiment, templates are scheduled for reservation and release. For example, if a specific network environment was needed at a specific time, or between a certain time, it is provisioned to automatically activate or deactivate accordingly.

In another embodiment, the disclosed system and method can be entirely accessed through a web browser. In this embodiment, topology templates are constructed by selecting on screen objects or options that represent device categories and abstracted values. These objects and options can be arranged graphically on a web canvas.

Figure 5:
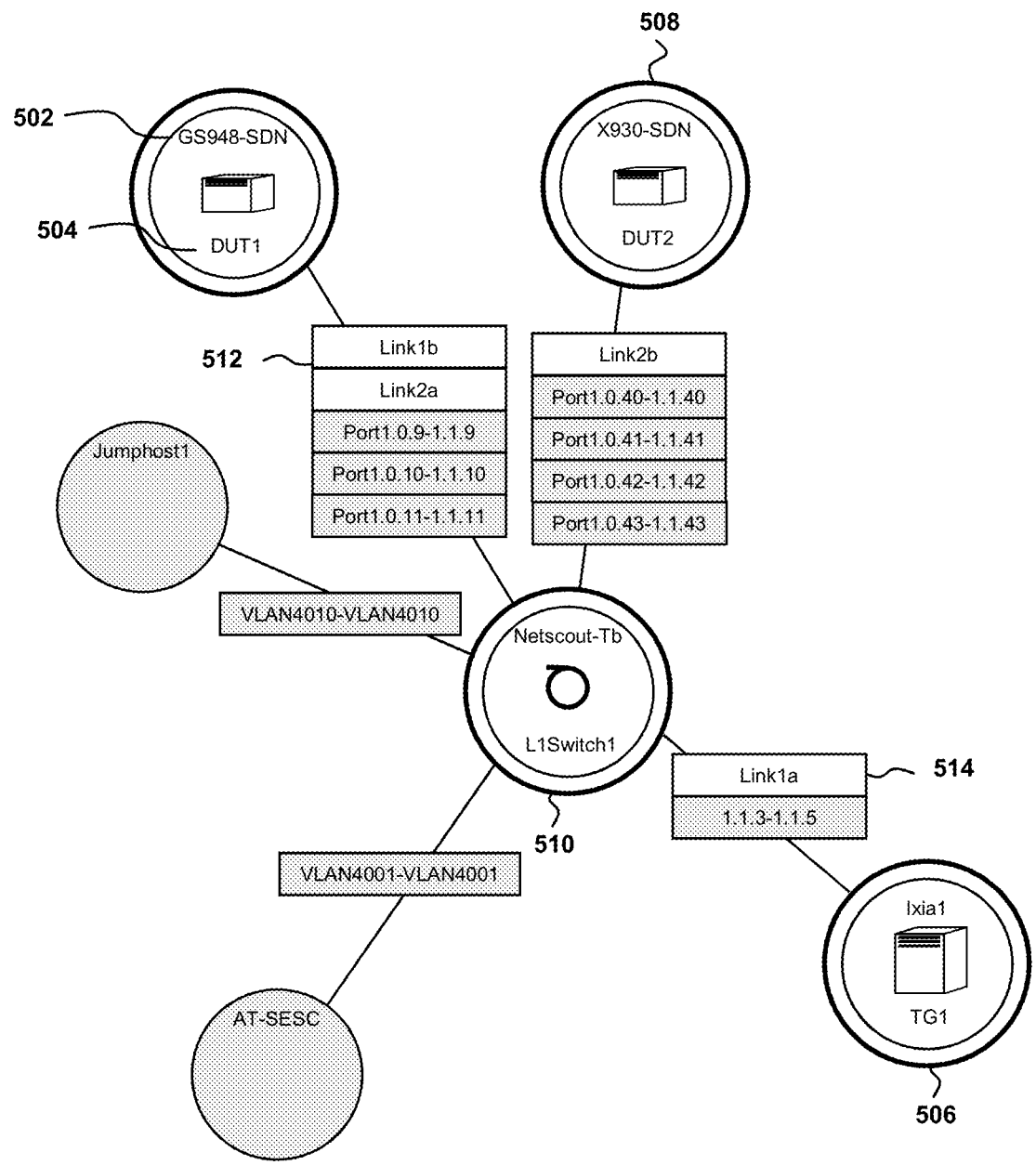
FIG. 5 shows a graphical user interface (GUI) of a system for creating a network template in accordance with one embodiment.

FIG. 5 shows a graphical user interface (GUI) of a system for creating a network template in accordance with one embodiment. The user may interact with abstractions rather than specific device information. The user sees generic label 504 rather than the specific device type 502. In this example, generic label 504 is for a DUT device, which may be a switch. There are two DUT category devices shown as DUT1 and DUT2. The specific device type 502 is the specific device in that category, such as a GS948-SDN switch or a x930-SDN switch. The user does not need to be concerned with the specific device type, only that they are using a switch and the attributes that the switch may accomplish. TG1 506 is a TG category device, which is different from the DUT category devices 504, 508 or the L1Switch1 category device 510.

The user may want to link a DUT category device 504, 508 with a TG category device 506. DUT1 504 may be connected to L1Switch1 510 via a link 512. The user may be presented with an abstracted link such as "Link 1b Link 2a." The user does not need to know that the link is on port 1.0.9-1.1.9 as shown in the fields below, which may be hidden to the user. L1Switch1 510 may then be connected to TG1 506 via another abstracted "Link1a" 514. In some embodiments, the links 512, 514 between DUT1 504 and TG1 506 may be simplified for the use, as in FIG. 6. The devices and links in use may be presented to the user in a GUI in a way to distinguish from devices and links that are not in use, e.g., devices and links not in use may be grayed out or devices and links in use may be highlighted, circled, colored, etc.

In another embodiment, such as depicted in FIG. 5, when a user is creating a network template, the user can assign generic labels, e.g., generic label is "DUT1", to specific devices, e.g., actual device name is "GS948-SDN", within the template based on their category and position within the network. These labels would serve as reference points that can be used to activate or automate certain functions when the template is activated.

Figure 6:
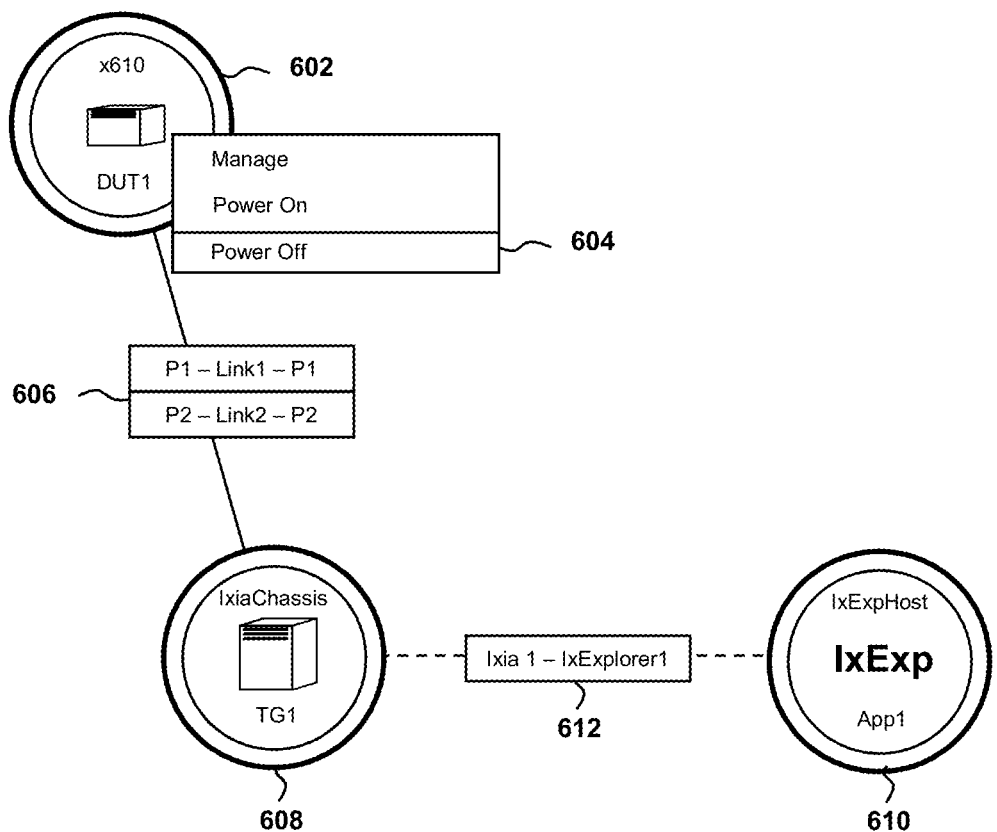
FIG. 6 shows the GUI of FIG. 5 with the network template activated in accordance with one embodiment.

FIG. 6 shows the GUI of FIG. 5 with the network template activated in accordance with one embodiment. In one embodiment of the user interface, the user is only dealing with abstractions, e.g. Link1, Link2 606, and doesn't need to worry about instructions to manage device selected. Selecting DUT1 602 may provide the user options to manage the device, power the device on, or power the device off. These actions may be selected by the user via the GUI or added as actions to a template, which may be stored or activated, as in FIG. 1. Based on the user selections, the actual device being used would be sent commands in the syntax required for that device.

The link 606 between DUT1 602 and TG1 608 could include a plurality of hops or be a direct connection. These devices 602, 608 could be in two completely separate locations, one could be virtual while the other could be physical, it could be connected from one cloud to another cloud, etc. To the user, the link 606 between the devices 602, 608 is transparent, and the user just knows that they are linked.

In this example, two ports from the traffic generator TG1 608 are sending traffic into switch DUT1 602 via Link1 and Link2 606. This could be a test environment where traffic is being driven through the switch 602 to measure some type of outcome. TG, DUT, and APP are categories. APP1 610 is an application running on traffic generator TG1 608. In a user created template, these elements may be set to run in a specific order, as shown in FIG. 4. For example, the traffic generator TG1 may be connected 606 to the switch DUT1, the application App1 may be loaded 612 onto the traffic generator TG1 608, and then the application App1 610 may be activated to generate traffic from the traffic generator TG1 608 to the switch DUT1. This order in the template ensures that these actions do not happen outside of the user specified order, e.g., so the application doesn't start generating traffic before the traffic generator is connected to the switch.

In another embodiment, such as depicted in FIG. 6, abstracted device actions may be immediately accessed by selecting them from a dropdown option 604, e.g., the option is "Power Off", on a graphical representation 602 of the device. When the option is selected, the selected value is translated to the mapped value understood by the underlying device.

Figure 7:
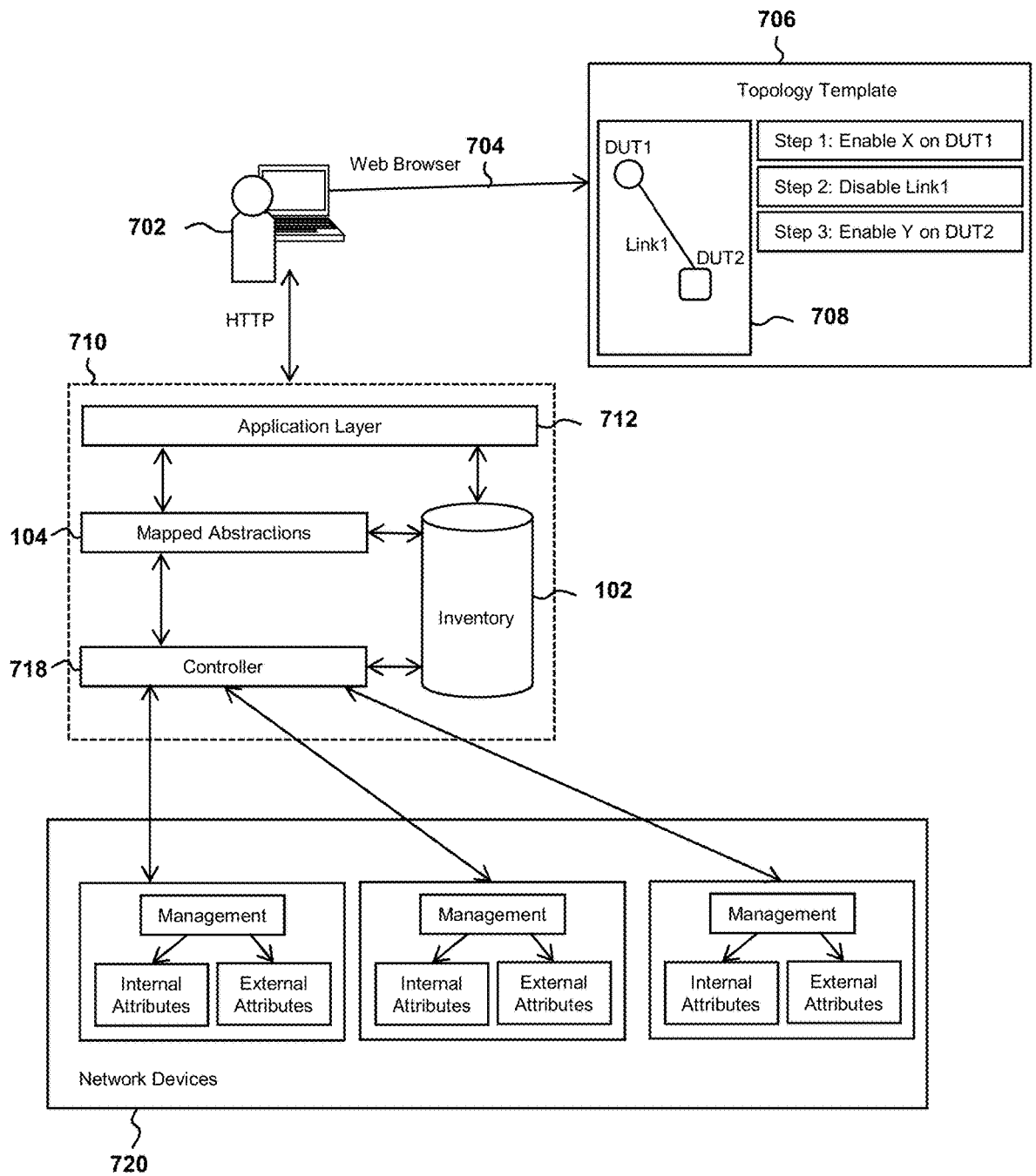
FIG. 7 shows a system used to create a network template based on categorized devices and network device in accordance with one embodiment.

FIG. 7 shows a system used to create a network template based on categorized devices and network device in accordance with one embodiment. A user 702 interacts with a web browser 704 to select 708 two categories of devices (DUT1 and DUT2), as shown in the user interface in FIG. 6. The order of steps is shown in FIG. 4.

The user interacts with application layer 712 through their web browser 704. Based on the user selections, network devices 720 may be connected and accomplish actions according to an activated template 110, as in FIG. 1. The controller 718 sends appropriate commands, API instructions, etc. to the individual network devices 720 to enable, disable, activate, deactivate, etc. based on whatever the user is requesting 708 in their activated template, e.g., connecting DUT1 with DUT2 via Link1. The controller 718 maps abstractions 104 to the underlying syntax based on the stored device inventory 102.

The internal attributes of each network device 720 are specific features that the device supports. The external attributes of each network device 720 are where the device is located and the devices connected to it. These external attributes could be used for network connections between the devices. For example, in FIG. 5, an external attribute may be that DUT1 is physically connected to L1Switch1. Internal attributes are individual unique features of each network device 720.

In one embodiment, as depicted in FIG. 7, users 702, access the system server 710 using a web browser 704. Mapped Abstractions 104 are presented via the application layer 712 and selected, arranged and saved as a template 706 on a web canvas 708. When the template is activated by the user, either immediately or provisioned for activation at a later time/date, the mapped abstractions are parsed and compared to resources in the inventory 102 and activated by the controller 718 on available or selected physical network devices 720. As internal and external attributes on physical devices are accessed on devices, their output and code responses are fed back to the controller 718 to their respective mapped abstractions 104 and presented to the user on the web canvas 708. In another embodiment of this invention, after a topology template is created, it can be activated through an API call from an external device.

Figure 8:
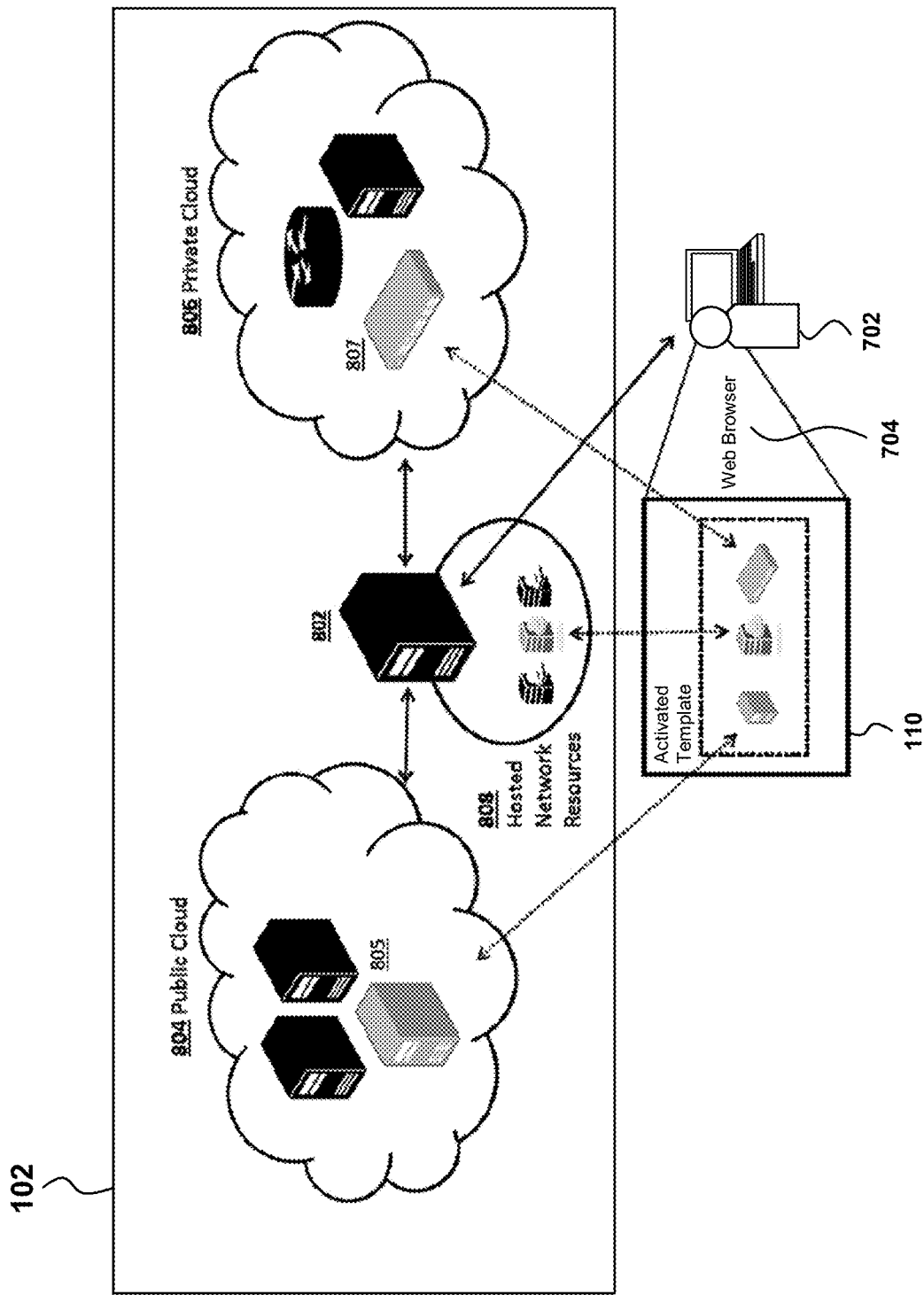
FIG. 8 shows a system used to activate templates with external resources and/or internal resources in accordance with one embodiment.

FIG. 8 shows a system used to activate templates with external resources and/or internal resources in accordance with one embodiment. The user requested attributes could be from devices in a virtual machine, a virtual cloud, etc. Devices are presented to the user, regardless of location, as one local resource. The stored device information 102 may include devices in a public cloud 804, hosted network resources 808, devices in a private cloud 806, etc.

As shown in the embodiment of FIG. 3, and others such as the one depicted in FIG. 8, templates on the system 802 can be activated on both external resources such as a the public cloud 804 and/or private cloud 806 as well as internally created and hosted 808. In this embodiment, from the point of the user 702, resources that are in separate locations and not directly reachable with each other, can be networked through the system to form logical connections with each other and presented to the user as a single manageable network.

Figure 9:
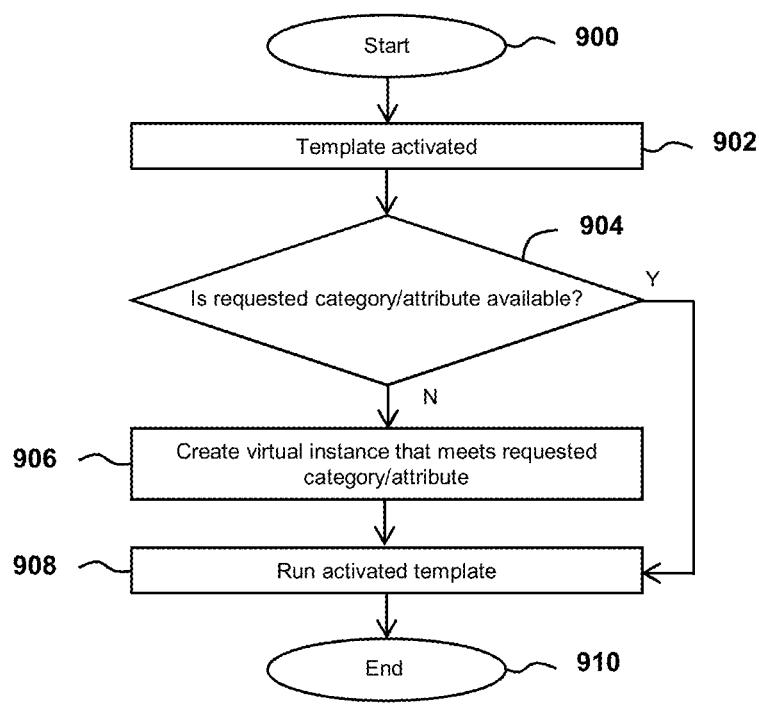
FIG. 9 shows an exemplary flow diagram for creating a virtual instance of a requirement if it is not otherwise available in accordance with one embodiment.

FIG. 9 shows an exemplary flow diagram for creating a virtual instance of a requirement if it is not otherwise available in accordance with one embodiment. The user may select a template to be activated (step 900). The template may be activated (step 902). The system may check to see if the requested category/attribute in the template is available (step 904). If the requested category/attribute is available, then the activated template is run (step 908), and the process is complete (step 910). If the requested category/attribute is not available, e.g., it is being used by another process, then the system may create a virtual instance that meets the requested category attribute (step 906), and the template may run using this created instance (step 908). In some embodiments, in addition to being able to create a virtual equivalent, the system may activate a combination of one or more available external resources and their attributes that most closely matches the request. Combining these resources and their attributes may include leveraging the creation of virtual instances and functions and combining them with available resources. The process of creating a virtual instance may not be shown to a user, and the system may work as if the requested category/attribute were available.

Figure 10:
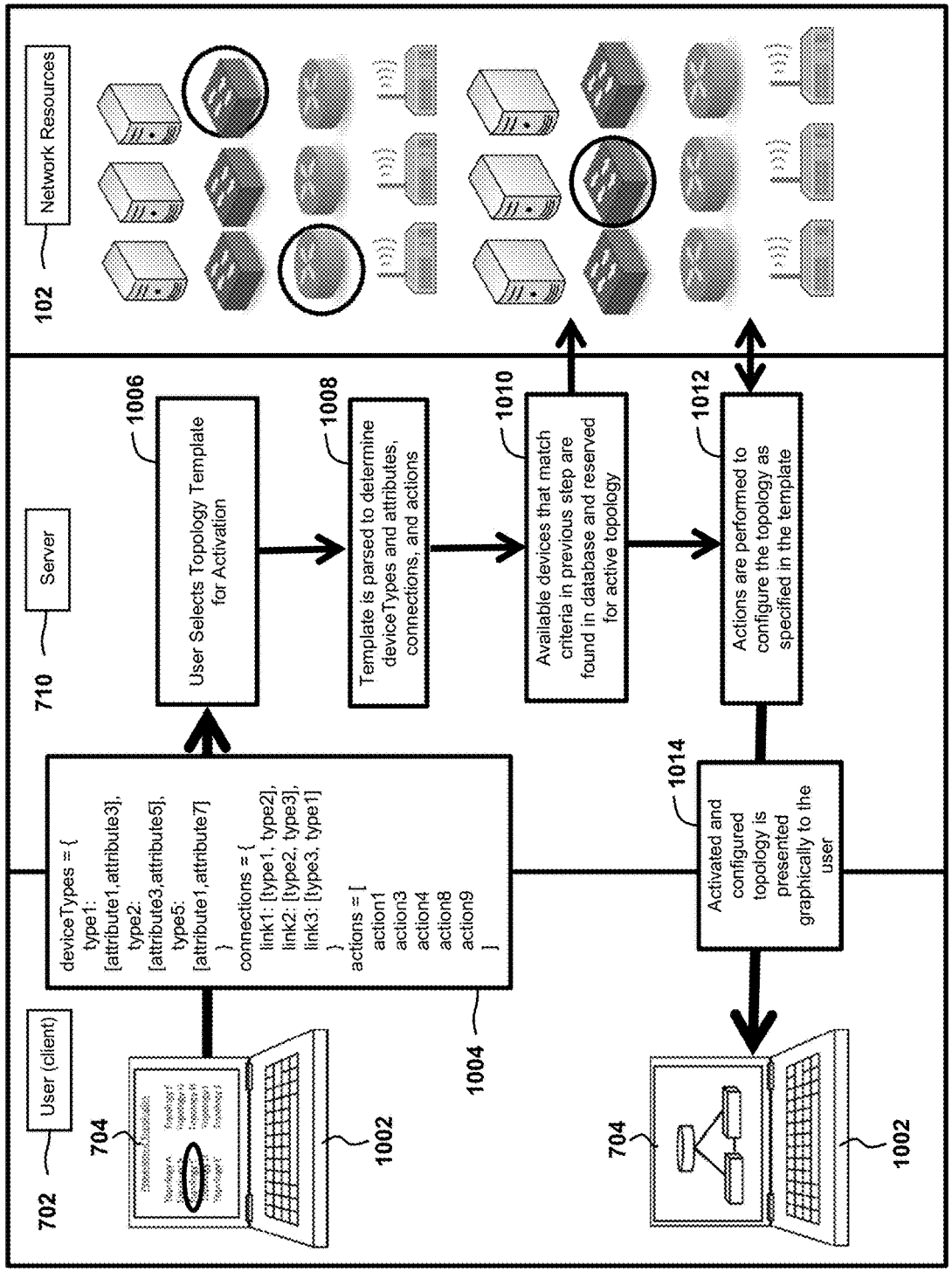
FIG. 10 shows an exemplary block diagram of an embodiment of the system and process disclosed herein in accordance with one embodiment.

FIG. 10 shows an exemplary block diagram of an embodiment of the system and process disclosed herein in accordance with one embodiment. The user 702 may use a computing device 1002 to access the system server 710 via the web browser 704. The user may be presented with a plurality of topology templates. The topology template 1004 may include a plurality of device types, attributes corresponding to each device type, a plurality of connections between the devices, and a plurality of actions.

The user selects a topology template for activation (step 1006). The topology template is parsed to determine the device types, attributes corresponding to the device types, connections, and actions (step 1008). The available devices that match the criteria in the topology template are found in the database and reserved for the active topology (step 1010). The available devices include network resources that may be stored in a database 102 and categorized based on device type for selection by a user into a topology template. The actions are performed to configure the topology as specified in the template (step 1012). The activated and configured topology is presented graphically to the user (step 1014). The user may view the configured topology via the web browser 704 of their computing device. The configured topology may be presented to show abstracted device types and links, as shown in FIG. 6, rather than the actual devices being used and the ports used to connect the devices.

The disclosed system may reduce the complexity of lab management, equipment sharing, and automation. Through the disclosed system, network and test resources can be abstracted and transformed into virtual elements that can be accessed, controlled, and automated via a web browser or rest API call. A centralized advanced management and tracking system may monitors and maintains the state of every resource and connection in network resources 102. Adding new resources to the disclosed system may involve supplying the credentials to be stored in the database of the network resources 102. Once a device is added, it can be instantly managed directly through the web browser 704 regardless of its management protocol.

The system may include built in driver support for a variety of Layer 1, SDN, and standard Ethernet switches, which makes the user 702 process for creating topologies and testbeds far easier than existing systems. The user 702 may use the GUI web browser 704 on the computing device 1002 to click on the resources and connections desired to instantly stitch together an infinite number of unique topologies. In some embodiments, the user may provision certain tasks and actions to be automated when specific topologies are activated such as loading configuration files, software, entering specific device commands, or executing external scripts. Once a topology or testbed is created, specific users or groups can be assigned read and write privileges that allow them access. Topologies and testbeds can be easily shared and reserved to block others from accessing them while in use.

The disclosed system may allow the user 702 to create and execute automation tests. Automated tests that span every device and connection within a topology or testbed can be easily created without the user 702 writing a single line of code. Once a test is created, it can be easily exported and imported from one topology to another without refactoring. The system may support a wide variety of products and device control protocols, such as Session Management (Telnet, SSH, HTTP, SNMP, RDP, VNC, REST, OpenFlow) and Test/Infrastructure Equipment (Ixia, Spirent, Netscout, MRV, Metamako).

The disclosed system may reduce capital expenditure (CAPEX) and operation expenditure (OPEX) costs, remove automation bottlenecks, enable anyone to create regression ready tests from the very start, maximize equipment utilization efficiency, eliminate the need to physically maintain multiple testbeds, and accelerate testing and time to market.

Time is lost due to the repetitive tasks of standing up and tearing down test beds. Certain teams may be tasked with providing comparative benchmark numbers for analyzing product performance strengths across a large number of configurations and features, such as App-Id, Threat inspection, SSL decryption, etc. This work may be compounded by the variety of protocols, e.g., HTTP, UDP, etc., and mixedapplication workload throughput testing, which are often used for sales opportunities and datasheet metrics.

One approach may involve standing up and cabling in devices, configuring a test bed, running the requisite benchmarks, and tearing down. This process may then need to be repeated for every next set of devices or firmware revisions, which could result in more time configuring than actually testing. Further, resources, such as Load Generators, may sit idle during downtime rather than be utilized.

The disclosed system allows all lab devices to be cabled and configured one time. Via the disclosed system, these network resources 102 are then abstracted in a centralized resource management GUI providing full visibility to every physical, virtual, and even cloud instances. This enables every user 702 with the capability to dynamically reserve their own test beds, save them as templates for future re-creation, automate their test runs, and then release the resources once completed. When it is time to change testbeds, the user 702 may simply drag and drop resources in the GUI and begin testing immediately. In some embodiments, existing automation frameworks may be ported over and installed in the system. All test libraries, scripts, etc. may be retained and made available through a repository in the disclosed system.

With the disclosed system, each user 702 can easily create hundreds of re-usable templates, eliminating the repetitious work of resetting up test beds. There is no more needing to physically change any cabling, rerack servers, or reconfigure testbeds. By doing so, the user 702 is now able to complete tests faster and achieve maximum utilization of the testing devices in the lab.

There are many different types of labs in the IT space with each one geared to achieve varying objectives for their organization. They range from end-user IT teams attempting to determine their next best server deployment to the largest vendor in the world trying to maintain the highest quality while still cranking out thousands of new devices a year.

Using the large scale manufacturer as an example, to take a product from concept to delivery, they follow a workflow that traverses a number of labs, each with their own purpose that may include R&D, DVT, EVT, Sustaining, QA, SQA, Manufacturing, Performance, TME, Interoperability, POC, Support, etc. Then, once a product finally hits the market, it is then likely going to be put through comparative testing in the labs of potential end-user customers.

Regardless of whether the lab exists at a vendor, customer, analysts, university, benchmarker, etc. or the objective is to determine performance, quality, best fit, etc., most share a certain commonality. They are all overly dependent on human interaction. While many labs have implemented automation frameworks and orchestration processes, even the most efficient of this bunch still require a heavy amount of manual, human labor.

The first issue this presents is that legacy labs are bound by the repetitive, manual work of having to rack, cable, and configure prior to ever even beginning to test. Then, after actually doing the testing, tear down and rinse-and-repeat for every new test bed needing to be put through the cycle. To put this in perspective, consider a laptop for example, and the large number of device and software combinations that need to be tested in order for a manufacturer to have the confidence to begin selling it in the open market. To adequately test just one laptop, it is possible that hundreds if not thousands of tests will be run across a dizzying number of testbeds. This is why large manufactures employee thousands of employees just in quality assurance roles alone.

In addition to the lost time associated with all of this manual work, there is a tremendous amount of waste in utilization of valuable resources. Often, costly infrastructure such as load generators and other test equipment are left sitting idle while these physical configurations and reconfigurations take place. Each lab may be constrained by access to their own resources and the sharing of these devices. For example, when test engineer A takes longer than anticipated to configure their test bed, test engineer B may be delayed in their completion. These delays cascade downstream to every lab in the workflow which will then negatively impact the entire product delivery schedule.

So far, this only covers the manual labor associated with the management and utilization of lab resources—mostly physical devices. The next major issue found with legacy labs is the tests themselves and what is required to build and execute the best possible tests. In some instances, one person could do all things—rack, stack, cable, config, automate, test, etc. In most cases, these require differing skillsets which means that larger labs separate this into three primary functions—lab management (cabling/racking/network config), testing, and automation.

In regards to building and executing tests, it begins by creating a series of scripts that eventually grows to a library over time. It requires someone with the ability to program in a particular language and with some common knowledge about the underlying product and technology. It is common for new test engineers to have one, but not the other so it takes time for ramp up, training, and acclimation before they are able to begin producing complex tests with multiple steps, if/thans, loops, and pass/fails. When new engineers join and previous ones leave, if protocols change, and with programming languages falling in and out of favor, test libraries can easily become cumbersome and fragmented.

If the lab is capable (has the time, expertise, etc.) then they may begin to implement more automation to combat these issue and create more efficiencies. This in itself manifests the next set of issues in that it usually requires a new set of skills and the similar cycle of ramp up followed by diminishing value over time. The end result is three distinct roles that don't necessarily always align. In very large organizations, there may be a person responsible for just cabling and another for network configuration—both of which might operate behind a helpdesk ticketing system that the test engineer must use to request changes.

These problems have existed since the beginning of information technology, but there are many forces at play that are pushing labs to the breaking point today. While "the cloud" might seem to make things easier, it is just another bunch of variables (AWS vs Azure vs Google vs . . . ) that further exacerbate the problems. Similarly, The Internet of Things (IoT) brings an additional innumerable amount of devices needing to be tested against. Combine this with the sheer speed of technology shifts and the competition to just stay current, labs of all sizes and purpose will need to modernize or face potential obsolescence.

Building on the concepts of Software Defined Networks (SDN), the disclosed system mitigates the constraints of physical connections. It allows for maximum flexibility and longevity in regards to differing knowledge, skillsets, and technology. The disclosed system may have a centralized network fabric in which all physical devices are physically cabled in one time via Layer 1 or Hybrid L1. Virtual devices and cloud instances are capable of being added to or removed from this mesh dynamically.

All three (physical, virtual, cloud) are thus abstracted and are capable of being linked in any combination in the disclosed system. In addition, these links themselves are abstractions. Further, all tests and the underlying automation are built in such a way that they utilize the resources by their assigned abstraction, as opposed to specific device names, IP addresses, etc.

With the disclosed system, the vast majority of all physical device connectivity and configuration is done one time only. After that initial setup, all devices are abstracted and visualized in a central GUI so that multiple users can simultaneously view real-time availability, create test beds on demand, reserve dynamically, and begin testing immediately. This eliminates legacy lab issues such as having to physically locate a device (as in "who borrowed my switch"), asking for or even requiring a cable change, network configuration, moving equipment, or the myriad of other related issues. The result is a significant savings in both man hours and the improved utilization of valuable resources such as load generators and related infrastructure. For instance, a load generator can now be shared down to a port for a few minutes as opposed to tying an entire appliance up for a day.

The disclosed system allows the dynamic linkage of any combination of physical and virtual devices along with cloud instances. During testing and especially in debugging scenarios, engineers often need access to third party tools on the fly. The disclosed system allows the immediate spin up of virtual machines or third party applications and tools in the environment they are already working in.

By building tests and automation based on abstracted resources, the lab gains the ability to easily clone and repurpose tests and test beds. Every combination of variables can easily be created and saved in a library that can be pulled from in the future. Since they are not dependent on device names or specific addressing, it is simple to apply any number of tests to any number of topologies. This flexibility in repurposing existing tests dramatically reduces the need for creating new tests or test specific automation policies.

Figure 11:
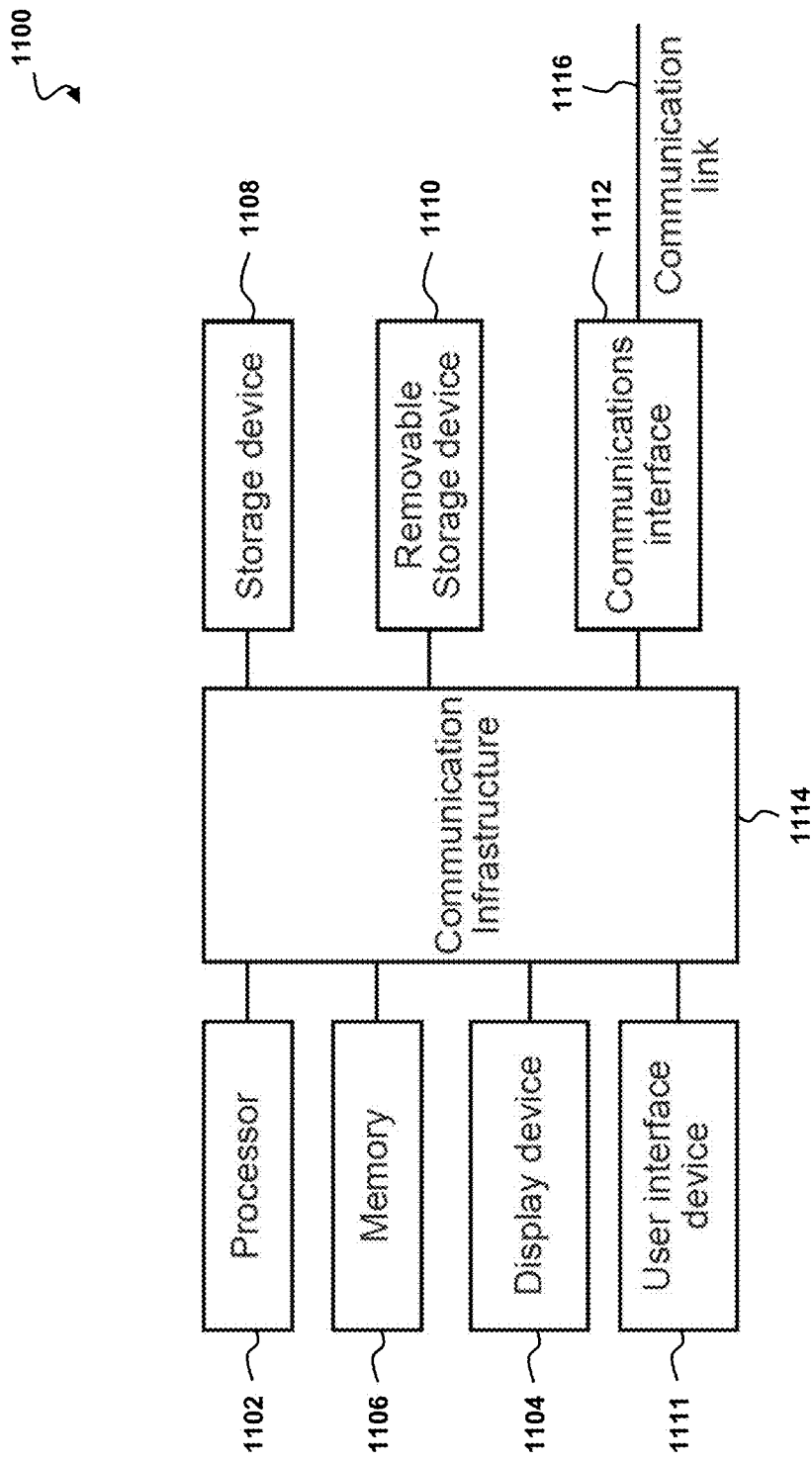
FIG. 11 shows a high-level block diagram and process of a computing system for implementing an embodiment of the system and process in accordance with one embodiment.

FIG. 11 is a high-level block diagram 1100 showing a computing system comprising a computer system useful for implementing an embodiment of the system and process, disclosed herein. Embodiments of the system may be implemented in different computing environments. The computer system includes one or more processors 1102, and can further include an electronic display device 1104 (e.g., for displaying graphics, text, and other data), a main memory 1106 (e.g., random access memory (RAM)), storage device 1108, a removable storage device 1110 (e.g., removable storage drive, a removable memory module, a magnetic tape drive, an optical disk drive, a computer readable medium having stored therein computer software and/or data), user interface device 1111 (e.g., keyboard, touch screen, keypad, pointing device), and a communication interface 1112 (e.g., modem, a network interface (such as an Ethernet card), a communications port, or a PCMCIA slot and card). The communication interface 1112 allows software and data to be transferred between the computer system and external devices. The system further includes a communications infrastructure 1114 (e.g., a communications bus, cross-over bar, or network) to which the aforementioned devices/modules are connected as shown.

Information transferred via communications interface 1114 may be in the form of signals such as electronic, electromagnetic, optical, or other signals capable of being received by communications interface 1114, via a communication link 1116 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 1112. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 12:
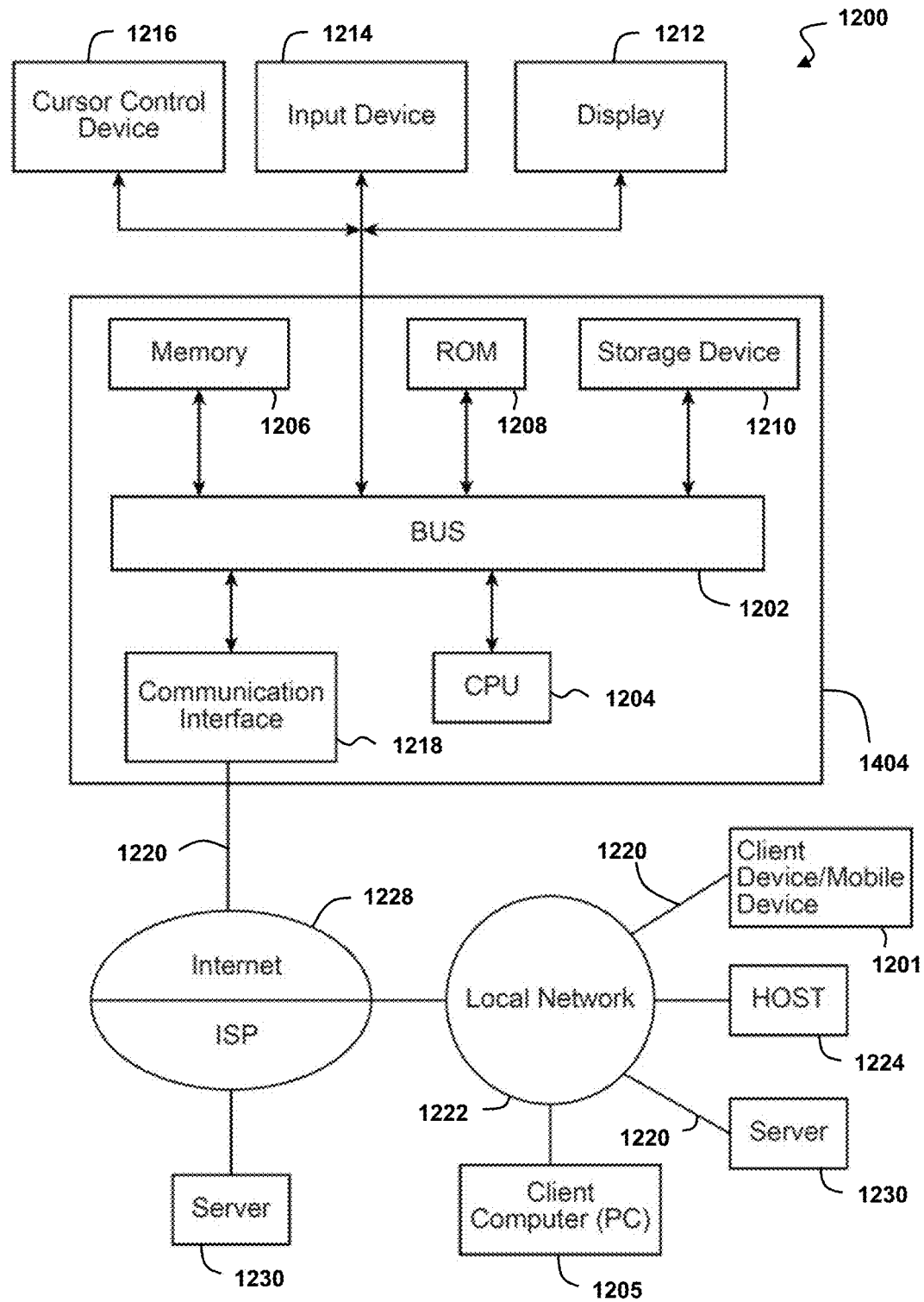
FIG. 12 shows a block diagram and process of an exemplary system in which an embodiment may be implemented in accordance with one embodiment.

FIG. 12 shows a block diagram of an example system 1200 in which an embodiment may be implemented. The system 1200 includes one or more client devices 1201 such as consumer electronics devices, connected to one or more server computing systems 1230. A server 1230 includes a bus 1202 or other communication mechanism for communicating information, and a processor (CPU) 1204 coupled with the bus 1202 for processing information. The server 1230 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution or instructions to be executed by the processor 1204. The server computer system 1230 further includes a read only memory (ROM) 1208 or other static storage device coupled to the bus 1202 for storing static information and instructions for the processor 1204. A storage device 1210, such as a magnetic disk or optical disk, is provided and coupled to the bus 1202 for storing information and instructions. The bus 1202 may contain, for example, thirty-two address lines for addressing video memory or main memory 1206. The bus 1202 can also include, for example, a 32-bit data bus for transferring data between and among the components, such as the CPU 1204, the main memory 1206, video memory and the storage 1210. Alternatively, multiplex data/address lines may be used instead of separate data and address lines.

The server 1230 may be coupled via the bus 1202 to a display 1212 for displaying information to a computer user. An input device 1214, including alphanumeric and other keys, is coupled to the bus 1202 for communicating information and command selections to the processor 1204. Another type or user input device comprises cursor control 1216, such as a mouse, a trackball, or cursor direction keys for communicating direction information and command selections to the processor 1204 and for controlling cursor movement on the display 1212.

According to one embodiment, the functions are performed by the processor 1204 executing one or more sequences of one or more instructions contained in the main memory 1206. Such instructions may be read into the main memory 1206 from another computer-readable medium, such as the storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 1204 for execution. Such a medium may take many forms, including but not limited to, non-volatile media, volatile media, and transmission media. Non-volatile media includes, for example, optical or magnetic disks, such as the storage device 1210. Volatile media includes dynamic memory, such as the main memory 1206. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the server 1230 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received from the main memory 1206 may optionally be stored on the storage device 1210 either before or after execution by the processor 1204.

The server 1230 also includes a communication interface 1218 coupled to the bus 1202. The communication interface 1218 provides a two-way data communication coupling to a network link 1220 that is connected to the world wide packet data communication network now commonly referred to as the Internet 1228. The Internet 1228 uses electrical, electromagnetic or optical signals that carry digital data streams. The signals through the various networks and the signals on the network link 1220 and through the communication interface 1218, which carry the digital data to and from the server 1230, are exemplary forms or carrier waves transporting the information.

In another embodiment of the server 1230, interface 1218 is connected to a network 1222 via a communication link 1220. For example, the communication interface 1218 may be an integrated services digital network (ISDN) card or a modem to provide a data communication connection to a corresponding type of telephone line, which can comprise part of the network link 1220. As another example, the communication interface 1218 may be a local area network (LAN) card to provide a data communication connection to a compatible LAN. Wireless links may also be implemented. In any such implementation, the communication interface 1218 sends and receives electrical electromagnetic or optical signals that carry digital data streams representing various types of information.

The network link 1220 typically provides data communication through one or more networks to other data devices. For example, the network link 1220 may provide a connection through the local network 1222 to a host computer 1224 or to data equipment operated by an Internet Service Provider (ISP). The ISP in turn provides data communication services through the Internet 1228. The local network 1222 and the Internet 1228 both use electrical, electromagnetic or optical signals that carry digital data streams. The signals through the various networks and the signals on the network link 1220 and through the communication interface 1218, which carry the digital data to and from the server 1230, are exemplary forms or carrier waves transporting the information.

The server 1230 can send/receive messages and data, including e-mail, program code, through the network, the network link 1220 and the communication interface 1218. Further, the communication interface 1218 can comprise a USB/Tuner and the network link 1220 may be an antenna or cable for connecting the server 1230 to a cable provider, satellite provider or other terrestrial transmission system for receiving messages, data and program code from another source.

The example versions of the embodiments described herein may be implemented as logical operations in a distributed processing system such as the system 1200 including the servers 1230. The logical operations of the embodiments may be implemented as a sequence of steps executing in the server 1230, and as interconnected machine modules within the system 1200. The implementation is a matter of choice and can depend on performance of the system 1200 implementing the embodiments. As such, the logical operations constituting said example versions of the embodiments are referred to for e.g., as operations, steps or modules.

Similar to a server 1230 described above, a client device 1201 can include a processor, memory, storage device, display, input device and communication interface (e.g., e-mail interface) for connecting the client device to the Internet 1228, the ISP, or LAN 1222, for communication with the servers 1230.

The system 1200 can further include computers (e.g., personal computers, computing nodes) 1205 operating in the same manner as client devices 1201, wherein a user can utilize one or more computers 1205 to manage data in the server 1230.

Figure 13:
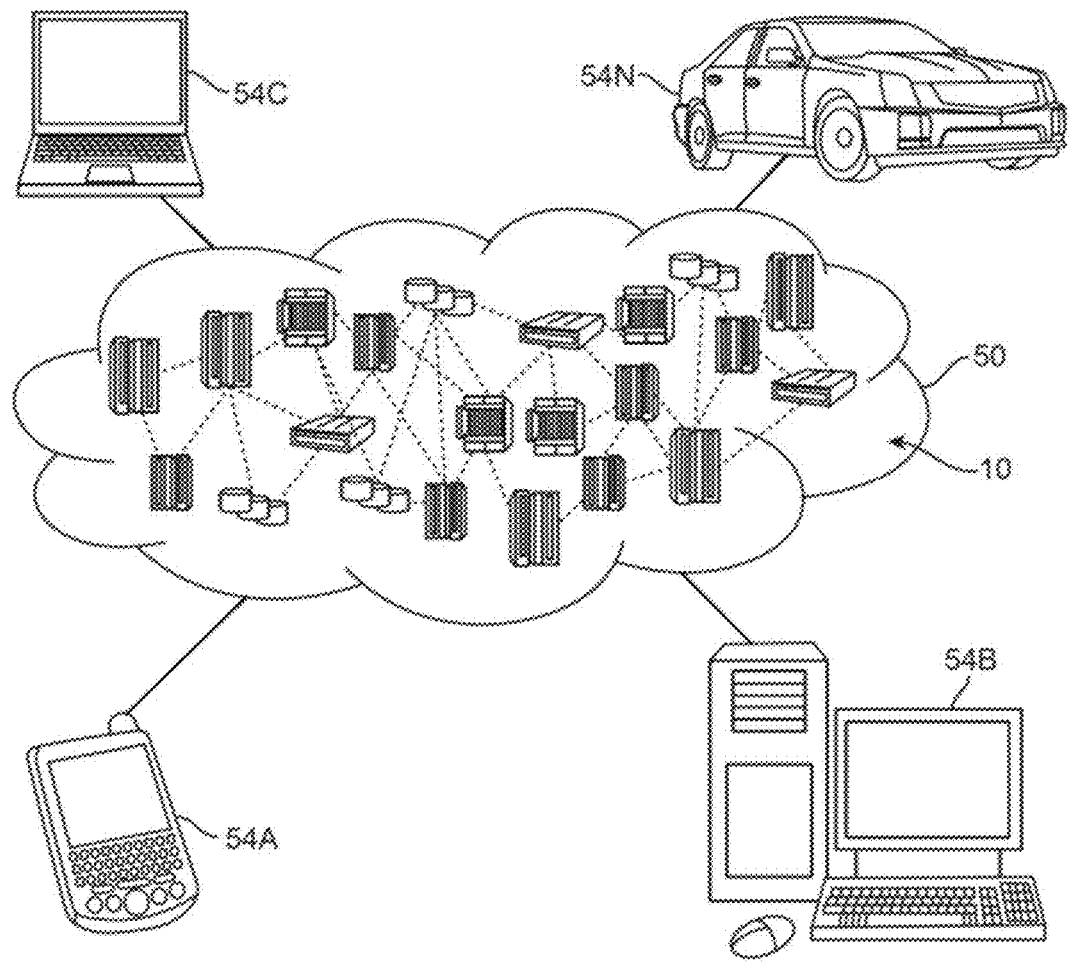
FIG. 13 shows a cloud computing environment for implementing an embodiment of the system and process disclosed herein in accordance with one embodiment.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
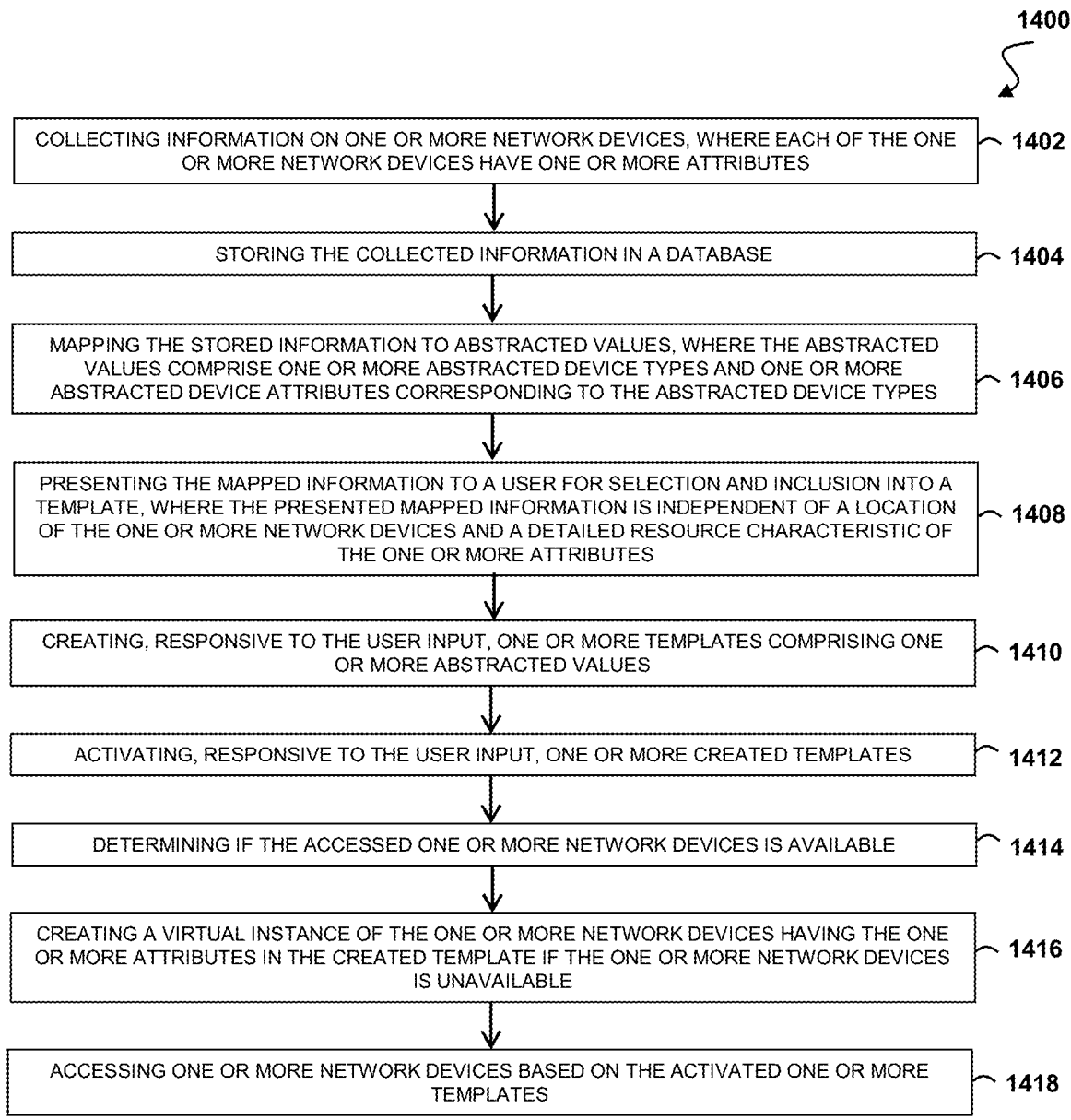
FIG. 14 shows an exemplary flow chart of an embodiment of the system and process disclosed herein in accordance with one embodiment.

FIG. 14 shows an exemplary flow chart of an embodiment of the system and process 1400 disclosed herein in accordance with one embodiment. The process may include collecting information on one or more network devices, where each of the one or more network devices have one or more attributes (step 1402). The network devices may include physical device, and virtual devices, or a combination thereof. The attributes may include a feature of the network device that can be enabled, the feature of the network device that can be disabled, a function that can be activated, the function that can be deactivated, a set of instructions that can be executed on the network device, a set of instructions that can be executed between two or more network devices, a physical characteristic of the network device that can be controlled, the physical characteristic of the network device that can be modified, an external connected component of the network device that can be controlled, the external connected component of the network device that can be modified, or a combination thereof.

The process may then include storing the collected information in a database (step 1404). The stored information may be mapped to abstracted values, where the abstracted values comprise one or more abstracted device types and one or more abstracted device attributes corresponding to the abstracted device types (step 1406). The mapped information may be presented to a user for selection and inclusion into a template (step 1408). The presented mapped information may be independent of a location of the one or more network devices and a detailed resource characteristic of the one or more attributes. The user may only interact with abstracted values so that the user only needs to know a single syntax, GUI, button, etc. of the disclosed system instead of the multiple syntaxes needed to instruct the underlying network devices.

The process may then involve creating, responsive to the user input, one or more templates comprising one or more abstracted values (step 1410). The abstracted values may include a physical device, a virtual device, a physical device attribute, a virtual device attribute, or a combination thereof (step 1412). The abstracted value may be an ability to power on a switch, turn off a port on a switch, connected the switch to a traffic generator, etc. that may be activated by the user selecting an event. The user interacts with the abstracted values for the devices and their attributes. The process may then include activating, responsive to the user input, one or more created templates (step 1412). The user may create templates in advance, and activate these templates when the user is ready to fulfill the functions in the template. The storing of templates may allow the user to do set-up work prior to when the actions need to be run. The templates may also be stored if the needed network devices corresponding to the user-selected abstracted values are unavailable.

The process may determine if the accessed one or more network devices is available (step 1414). In some embodiments, the template may not be run or activated if the desired network devices are not available. In other embodiments, the system may create a virtual instance of the one or more network devices having the one or more attributes in the created template if the one or more network devices are unavailable (step 1416). In addition to being able to create a virtual equivalent, the system may activate a combination of one or more available external resources and their attributes that most closely matches the request. Combining these resources and their attributes may include leveraging the creation of virtual instances and functions and combining them with available resources. The process may then access the one or more network devices based on the activated one or more templates (step 1418).

The foregoing description, for purpose of explanation, has been described with reference to specific embodiments. However, the illustrative discussions above are not intended to be exhaustive or to limit the embodiments disclosed. Many modifications and variations are possible in view of the above teachings.

Those skilled in the art will appreciate that various adaptations and modifications of the described preferred embodiments can be configured without departing from the scope and spirit of the improved pressure switch system described herein. Therefore, it is to be understood that, within the scope of the embodiments, the switch system may be practiced other than as specifically described herein.

What is claimed is:

1. A method comprising:
   collecting information on one or more network devices, wherein each of the one or more network devices have one or more attributes;

storing the collected information in a database;
mapping the stored information to abstracted values, wherein the abstracted values comprise one or more abstracted device types and one or more abstracted device attributes corresponding to the abstracted device types;
presenting the mapped information to a user for selection and inclusion into a template, wherein the presented mapped information is independent of a location of the one or more network devices and a detailed resource characteristic of the one or more attributes;
creating, responsive to the user input at a graphical user interface, one or more topology templates by selecting on screen objects that represent device categories and one or more abstracted values to be arranged graphically on a web canvas and provisioned for activation based on a order of selection by the user of the on screen objects that represent device categories and the one or more abstracted values, wherein the order of selection by the user comprises: connecting a traffic generator to a switch;
activating, responsive to the user input, one or more created templates; and
accessing one or more network devices based on the activated one or more templates.

2. The method of claim 1, wherein the one or more network devices are at least one of: a physical device and a virtual device.

3. The method of claim 1, wherein the one or more abstracted device attributes are at least one of: a feature of the network device that can be enabled and the feature of the network device that can be disabled.

4. The method of claim 1, wherein the one or more abstracted device attributes are at least one of: a function of the network device that can be activated and the function of the network device that can be deactivated.

5. The method of claim 1, wherein the one or more abstracted device attributes are at least one of: a set of instructions that can be executed on the network device and a set of instructions that can be executed between two or more network devices.

6. The method of claim 1, wherein the one or more abstracted device attributes are at least one of: a physical characteristic of the network device that can be controlled and the physical characteristic of the network device that can be modified.

7. The method of claim 1, wherein the one or more abstracted device attributes are at least one of: an external connected component of the network device that can be controlled and the external connected component of the network device that can be modified.

8. The method of claim 1 further comprising:
determining if the accessed one or more network devices is available; and
creating a virtual instance of the one or more network devices having the one or more attributes in the created template if the one or more network devices is unavailable.

9. The method of claim 1 wherein the abstracted device types are at least one of: a physical device and a virtual device, and wherein the abstracted device attributes are at least one of: a physical device attribute, and a virtual device attribute.

10. The method of claim 1, wherein the created one or more template further comprise one or more connections between the one or more abstracted device types.

11. The method of claim 10, wherein the created one or more template further comprise one or more actions, wherein the one or more actions are based on the one or more abstracted device types, the one or more abstracted device attributes, and the one or more connections between the one or more abstracted device types.

12. A method comprising:
collecting information on one or more network devices, wherein each of the one or more network devices have one or more attributes;
storing the collected information in a database;
mapping the stored information to abstracted values, wherein the abstracted values comprise one or more abstracted device types and one or more abstracted device attributes corresponding to the abstracted device types;
presenting the mapped information to a user for selection and inclusion into a template, wherein the presented mapped information is independent of a location of the one or more network devices and a detailed resource characteristic of the one or more attributes;
creating, responsive to the user input at a graphical user interface, one or more topology templates by selecting on screen objects that represent device categories and one or more abstracted values to be arranged graphically on a web canvas and provisioned for activation based on a order of selection by the user of the on screen objects that represent device categories and the one or more abstracted values, wherein the order of selection by the user comprises at least: connecting a traffic generator to a switch; loading an application onto the traffic generator; and generating traffic from the traffic generator to the switch;
activating, responsive to the user input, one or more created templates; and
accessing one or more network devices based on the activated one or more templates.

13. The method of claim 1, wherein the order of selection by the user further comprises:
loading an application onto the traffic generator after the traffic generator is connected to the switch.

14. The method of claim 13, wherein the order of selection by the user further comprises:
generating traffic from the traffic generator to the switch after the application is loaded onto the traffic generator.

15. The method of claim 1, wherein the order of selection by the user connects two or more network devices prior to activating an application that requires the connection between the two or more network devices.

16. The method of claim 1, wherein the one or more created templates are activated based on the order of selection by the user.

17. The method of claim 1, wherein the one or more abstracted values comprise an ability to power on a switch, turn off a port on the switch, and connect the switch to a traffic generator.

* * * * *